United States Patent
Marchal et al.

(10) Patent No.: US 10,364,516 B2
(45) Date of Patent: Jul. 30, 2019

(54) 3D WOVEN FIBER STRUCTURE, A FIBER PREFORM OBTAINED FROM SUCH A FIBER STRUCTURE, AND A COMPOSITE MATERIAL PART INCLUDING SUCH A PREFORM

(71) Applicant: Safran Aircraft Engines, Paris (FR)

(72) Inventors: Yann Marchal, Portsmouth, NH (US); Dominique Coupe, Medford, MA (US); Monica Fruscello, Amesbury, MA (US); Jonathan Goering, York, ME (US)

(73) Assignee: Safran Aircraft Engines, Paris (FR)

( * ) Notice: Subject to any disclaimer, the term of this patent is extended or adjusted under 35 U.S.C. 154(b) by 681 days.

(21) Appl. No.: 14/365,307

(22) PCT Filed: Dec. 10, 2012

(86) PCT No.: PCT/FR2012/052855
§ 371 (c)(1),
(2) Date: Jun. 13, 2014

(87) PCT Pub. No.: WO2013/088042
PCT Pub. Date: Jun. 20, 2013

(65) Prior Publication Data
US 2014/0315457 A1    Oct. 23, 2014

Related U.S. Application Data

(60) Provisional application No. 61/570,423, filed on Dec. 14, 2011.

(51) Int. Cl.
*D03D 25/00*    (2006.01)
*B29B 11/16*    (2006.01)
(Continued)

(52) U.S. Cl.
CPC ............ *D03D 25/005* (2013.01); *B29B 11/16* (2013.01); *B29C 70/222* (2013.01); *B29L 2031/003* (2013.01); *Y10T 442/20* (2015.04)

(58) Field of Classification Search
CPC ...... D03D 25/005; D03D 11/02; B29C 70/24; B29C 70/222; B29C 70/682;
(Continued)

(56) References Cited

U.S. PATENT DOCUMENTS

| 4,922,968 A | 5/1990 | Böttger et al. |
| 6,446,675 B1 * | 9/2002 | Goering ............... D03D 25/005 |
| | | 139/11 |

(Continued)

FOREIGN PATENT DOCUMENTS

WO    WO 2006/062670 A1    6/2006

OTHER PUBLICATIONS

International Search Report dated Nov. 20, 2013 in PCT/FR12/052855 Filed Dec. 10, 2012.

*Primary Examiner* — Camie S Thompson
(74) *Attorney, Agent, or Firm* — Oblon, McClelland, Maier & Neustadt, L.L.P.

(57) ABSTRACT

A fiber preform is formed by a fiber structure woven by three-dimensional weaving with a plurality of layers of warp yarns interlinked by weft yarns of a plurality of layers of weft yarns, the fiber preform having a first portion and a second portion that extend one another in the weft direction and that are at an angle to each other. In the fold zone and in each weft plane of the fiber structure, two weft yarns situated in a region adjacent to an outside face of the fiber structure situated on the inside of the corner present paths that cross, so that less curvature is imposed on these yarns.

18 Claims, 3 Drawing Sheets

(51) Int. Cl.
*B29C 70/22* (2006.01)
*B29L 31/00* (2006.01)

(58) Field of Classification Search
CPC ......... Y10T 442/3195; Y10T 442/3179; Y10T 442/3528; Y10T 442/3569; Y10T 442/3594; Y10T 442/20; Y10T 442/3203; Y10T 442/1362; Y10T 156/1051; B32B 2250/20; B32B 3/30; B32B 5/024; B32B 5/26; B32B 2260/023; B32B 3/04; F05D 2300/603; F05D 2300/6012; F05D 2300/44; F05D 2300/601; B29K 2105/0845
USPC ........... 139/383 R, 384 R; 442/59, 205, 206, 442/246, 251, 254, 203; 428/36.1; 156/148, 22
See application file for complete search history.

(56) References Cited

U.S. PATENT DOCUMENTS 6,874,543 B2    4/2005   Schmidt et al.
2011/0308702 A1* 12/2011 Serey ..................... B29C 70/24
                                                    156/93

* cited by examiner

3D WOVEN FIBER STRUCTURE, A FIBER PREFORM OBTAINED FROM SUCH A FIBER STRUCTURE, AND A COMPOSITE MATERIAL PART INCLUDING SUCH A PREFORM

BACKGROUND OF THE INVENTION

The invention relates to making a fiber structure woven as a single piece by three-dimensional (3D) weaving, in particular for fabricating a composite material part. One particular, but non-exclusive, field of application of the invention lies in making fiber structures for preforms of composite material parts for aircraft or turbomachines, in particular for aviation turbine engines.

In well-known manner, a composite material part may be obtained by making a fiber preform and by densifying the preform with a matrix. Depending on the intended application, the preform may be made of glass, carbon, or ceramic fibers, and the matrix may be made of an organic material (polymer) of carbon, or of ceramic.

For parts that are relatively complex in shape, it is known to make a fiber structure or blank as a single piece by 3D (or multiple-layer) weaving, and to shape the blank so as to obtain a fiber preform that presents a shape that is close to the shape of the part that is to be fabricated. Shaping often includes a folding operation in order to form an angle between two portions of the 3D woven structure.

This can result in the yarns of the fiber structure being excessively stressed mechanically in a fold zone, in particular on the inside of the corner that is formed when said corner is sharp.

OBJECT AND SUMMARY OF THE INVENTION

An object of the invention is to remedy such a drawback.

In a first aspect of the invention, this object is achieved by a fiber structure woven by three-dimensional weaving with a plurality of layers of warp yarns interlinked by weft yarns of a plurality of layers of weft yarns, the fiber structure having a first portion and a second portion situated extending each other in the weft direction and foldable relative to each other at a fold zone;

in which structure, in the fold zone and in each weft plane of the fiber structure, the yarns of two layers of weft yarns situated in a region adjacent to an outside face of the fiber structure have paths that cross.

As explained below, such an arrangement serves to limit the curvature that is imposed on the yarns in the fold zone while folding.

According to another aspect of the invention, the invention provides a fiber preform formed by a fiber structure woven by three-dimensional weaving with a plurality of layers of warp yarns interlinked by weft yarns of a plurality of layers of weft yarns, the fiber structure having a first portion and a second portion situated extending each other in the weft direction and forming between them an angle by folding at a fold zone;

in which preform, in the fold zone and in each weft plane of the fiber structure, the yarns of two layers of weft yarns situated in a region adjacent to an outside face of the fiber structure situated on the inside of the corner have paths that cross.

Advantageously, one of the two weft yarns is the yarn that, in the first or the second portion, is the closest to the outside face.

In an embodiment of the fiber structure or of the fiber preform, in the fold zone, the yarns of the two layers of weft yarns closest to the outside face of the fiber structure have paths that cross.

In another embodiment of the fiber structure or of the fiber preform, in the fold zone, the yarns of the first and third layers of weft yarns from the outside face of the fiber structure have paths that cross, and likewise the yarns of the second and fourth layers of weft yarns.

In yet other aspects of the invention, the invention provides a fiber structure or a fiber preform as defined above in which the terms "weft" and "warp" are interchanged.

In yet another aspect of the invention, the invention provides a composite material part comprising a fiber preform as defined above that is densified by a matrix.

BRIEF DESCRIPTION OF THE DRAWINGS

The invention can be better understood on reading the following description given by way of non-limiting indication with reference to the accompanying drawings, in which.

DETAILED DESCRIPTION OF EMBODIMENTS

In order to avoid overcrowding the drawings, in FIGS. 1, 2, 5, 6, 8, and 9, which show weft planes, the paths of the weft yarns are represented by straight line segments, while the warp yarns are represented by dots. The term "weft plane" is used to mean a plane perpendicular to the warp direction and containing a column of weft yarns. Since 3D weaving is involved, it will be understood that the yarns of one of the weft and warp directions follow sinuous paths in order to interlink the yarns of the other direction belonging to different layers of yarns, with the exception of any non-interlinked zones and of any weft yarns that may be added at the surface in order to perform two-dimensional (2D) weaving therein. Various 3D weaves may be used, such as interlock, multiple-satin, or multiple-plain weaves, for example as described in particular in Document WO 2006/136755. It is possible in particular to make use of a 3D interlock weave where this definition includes a satin type surface weave.

Figure 1:
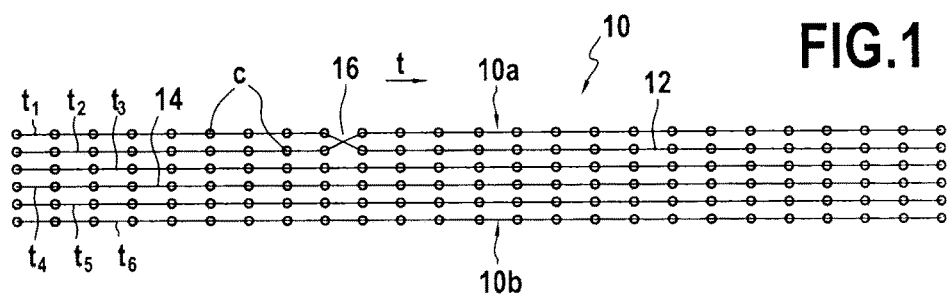
FIG. 1 is a highly diagrammatic view of a plane of a 3D woven fiber structure in an embodiment of the invention.

FIG. 1 is a highly diagrammatic view of a weft plane of a fiber structure 10 that is 3D woven as a single piece having opposite outside faces 10a and 10b. The fiber structure 10 is made up of a plurality of layers of warp yarns c, the warp yarns of the different layers being interlinked by weft yarns in a plurality of layers of weft yarns $t_1$ to $t_6$ that provide the 3D weaving. In FIG. 1, reference $\underline{t}$ designates the weft direction.

Figure 2:
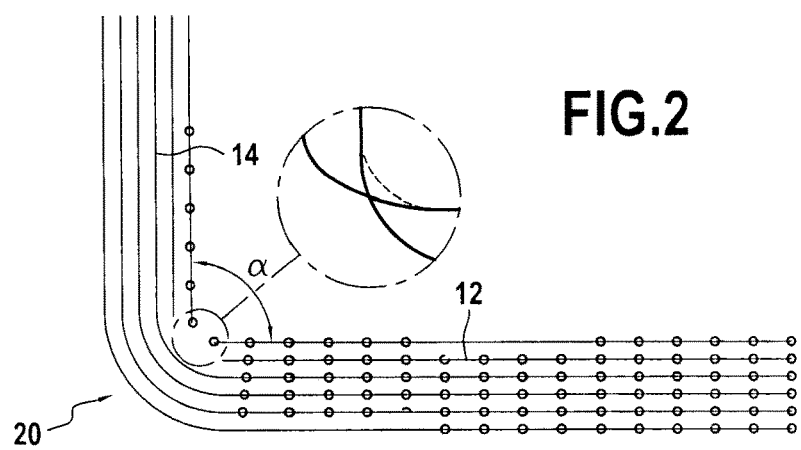
FIG. 2 is a highly diagrammatic view of a plane of a fiber preform obtained after shaping the FIG. 1 fiber structure.

The fiber structure 10 comprises two portions 12 and 14 extending each other and that are foldable relative to each other in a fold zone 16 in order to form a fiber preform 20 as shown in FIG. 2, with the portions 12 and 14 then forming between them a non-zero angle α. The fiber preform 20 in the example shown presents a section that is substantially L-shaped. As shown in FIG. 1, in each of the portions 12 and 14, all of the warp yarns c are interlinked by 3D weaving by the weft yarns $t_1$ to $t_6$ so as to be free of a non-interlinked zone.

The paths of the weft yarns $t_1$ and $t_2$ that are closest to the face 10a cross in the fold zone 16, the face 10a being the face that, after folding, is situated on the inside of the angle formed by the portions 12 and 14. As a result, the arrangements of the weft yarns $t_1$ and $t_2$ in each plane of the fiber structure in the portion 12 and in the portion 14 are inverted on opposite sides of the fold zone 16.

As can be seen more particularly in the detail on a larger scale in FIG. 2, the radius of curvature imposed on the weft yarns $t_1$ and $t_2$ is thus greater than the radius of curvature (shown as a dashed line) that would be imposed on the yarn $t_1$ if it did not cross the yarn $t_2$. The risk of weft yarns being damaged or buckling in the vicinity of the face 10a is thus reduced by this reduction in the amount of curvature that is imposed, which risk is particularly high when the angle α is small.

Figure 3:
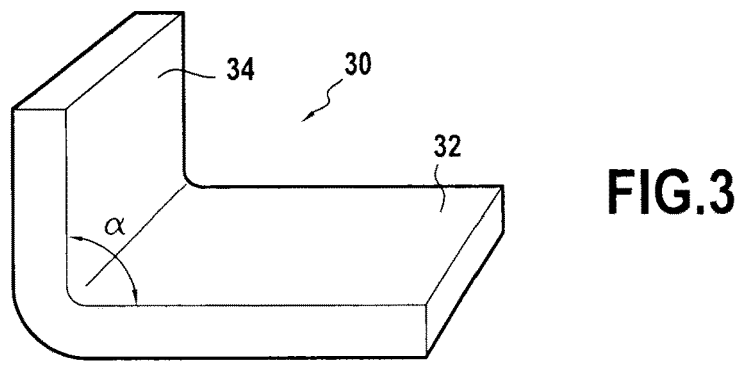
FIG. 3 is a diagrammatic view in perspective of a part fabricated from a preform of the FIG. 2 type.

FIG. 3 shows a composite material part 30 of the kind that can be obtained by densifying the preform 20 with a matrix, the part having two portions 32 and 34 that form a non-zero angle between each other.

In FIGS. 2 and 3, the folding is performed about an axis that is substantially parallel to the warp direction.

Figure 4:
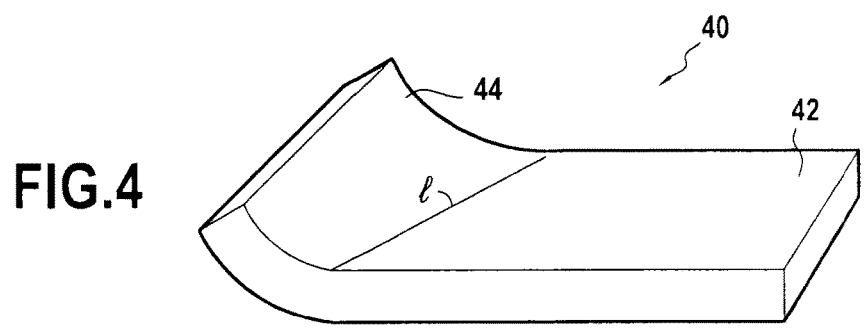
FIG. 4 is a diagrammatic view in perspective of another part that can be fabricated from a fiber preform of the invention.

In a variant, the folding may be performed about an axis l that is parallel to a plane formed by the weft and warp directions but that is not parallel to either of them so that, after densification of the fiber preform, the part 40 as shown in FIG. 4 presents two portions 42 and 44 that form a non-zero angle between each other. Under such circumstances, in order to comply with the orientation of the fold zone, arrangements are made so that the locations of the crossovers between the weft yarns in the vicinity of the face 10a are not all situated on the same warp column over the entire width of the preform, but vary from one weft plane to another. In a variant, it is possible to use a preform similar to that used for the part shown in FIG. 3, but with the preform being shaped by being placed on the bias in a mold that has the desired shape, so as to put the locations of the crossovers between the weft yarns in alignment with the axis l.

Figure 5:
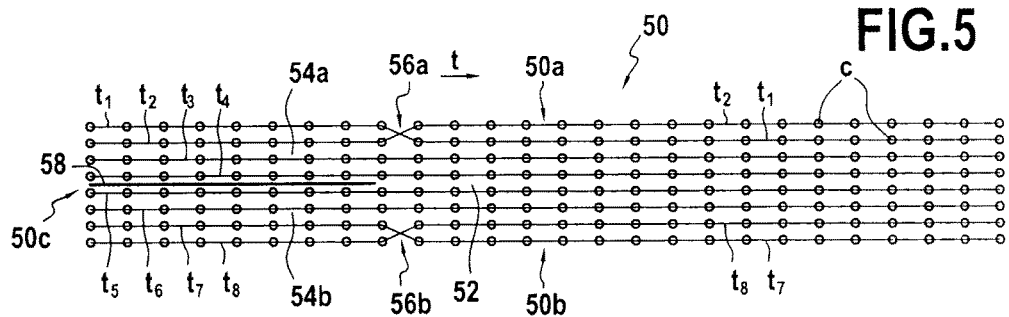
FIG. 5 is a highly diagrammatic view of a plane of a 3D woven fiber structure in a variant of the FIG. 1 embodiment.

FIG. 5 is a highly diagrammatic view of a weft plane of a fiber structure 50 that is 3D woven as a single part having opposite outside faces 50a and 50b. The fiber structure 50 is made up of a plurality of layers of warp yarns $\underline{c}$.

The fiber structure 50 includes a portion 52 in which the warp yarns in all of the layers of warp yarns are interlinked by 3D weaving by means of the weft yarns of a plurality of layers of weft yarns $t_1$ to $t_8$ that provide 3D weaving. The fiber structure 50 also has two portions 54a and 54b that are situated so as to extend the portion 52 on either side of a non-interlinked zone 58 that extends from one edge 50c of the fiber structure 50 over a fraction of its dimension in the weft direction. In each of the portions 54a and 54b, the warp yarns in all of the warp yarn layers are interlinked by 3D weaving by means of weft yarns respectively $t_1$ to $t_4$ and $t_5$ to $t_8$, with no interlinking taking place across the non-interlinked zone 58 between the portions 54a and 54b. In the example shown, the numbers of layers of warp yarns in the portions 54a and 54b are equal to four. Naturally, these numbers need not necessarily be four, and they could even be different from each other, providing that each of them is not less than two.

Figure 6:
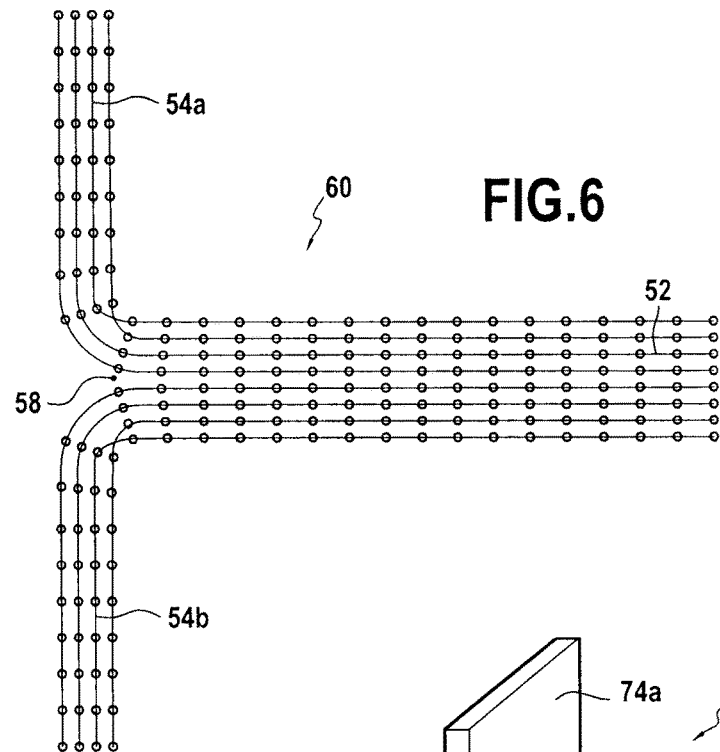
FIG. 6 is a highly diagrammatic view of a plane of a fiber preform obtained after shaping the FIG. 5 fiber structure.

The portions 54a and 54b can be folded outwards relative to the portion 52 in respective fold zones 56a and 56b in order to form a fiber preform 60 as shown in FIG. 6 and presenting a section that is substantially T-shaped.

The paths of the weft yarns $t_1$ and $t_2$ that are closest to the face 10a cross in the fold zone 56a so that the arrangements of the weft yarns $t_1$ and $t_2$ in each plane of the fiber structure 50 in the portion 52 and in the portion 54a are interchanged. Similarly, the paths of the weft yarns $t_7$ and $t_8$ that are closest to the face 50b cross in the fold zone 56b so that the arrangements of the weft yarns $t_7$ and $t_8$ in each plane of the fiber structure in the portion 52 and in the portion 54b are interchanged.

As in the embodiment of FIGS. 1 and 2, reduced curvature is thus imposed on the weft yarns adjacent to the faces 50a and 50b in comparison with an arrangement in which the weft yarns $t_1$ & $t_2$ and $t_7$ & $t_8$ do not present any mutual crossings.

Figure 7:
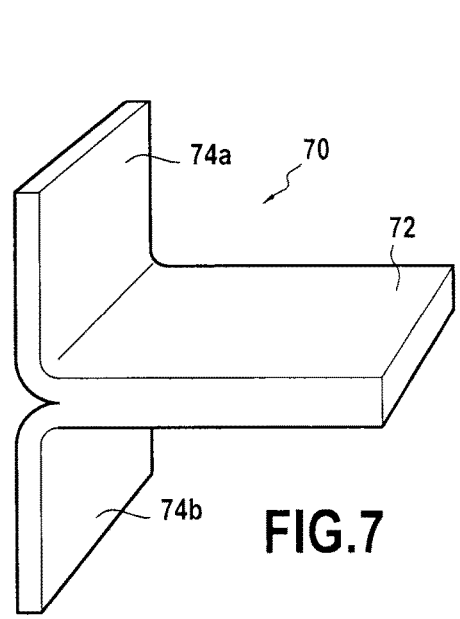
FIG. 7 is a diagrammatic view in perspective of a part fabricated from a preform of the FIG. 6 type.

FIG. 7 shows a part 70 made of composite material that presents a substantially T-shaped section and that can be obtained by densifying the preform 60 with a matrix, the part presenting a portion 72 that is extended at one end by flanges 74a and 74b.

Figure 8:
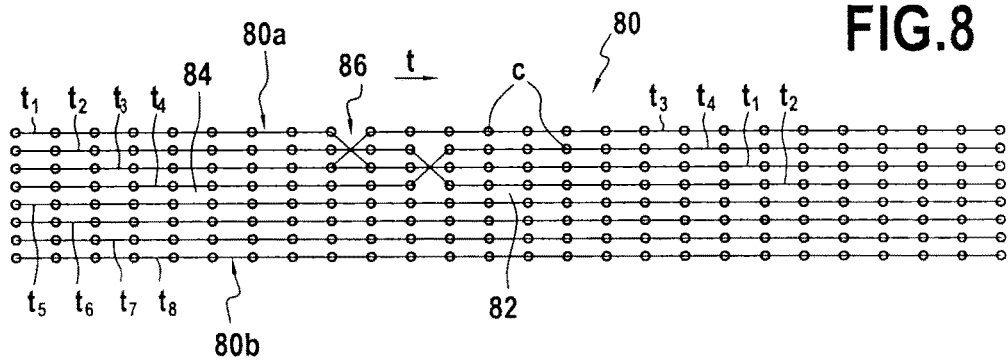
FIG. 8 is a highly diagrammatic view of a plane of a 3D woven structure in another embodiment of the invention.

FIG. 8 is a highly diagrammatic view of a weft plane of a fiber structure 80 that is 3D woven as a single piece, having opposite outside faces 80a and 80b. The fiber structure 80 is made up of a plurality of layers of warp yarns $\underline{c}$, with warp yarns of different layers being interlinked by weft yarns in a plurality of layers of weft yarns $t_1$ to $t_8$ that provide 3D weaving.

Figure 9:
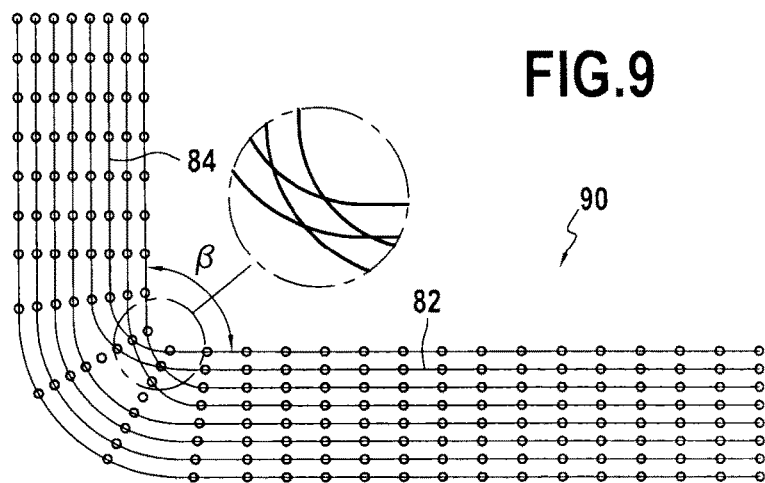
FIG. 9 is a highly diagrammatic view of a plane of a fiber preform obtained after shaping the FIG. 8 fiber structure.

The fiber structure 80 comprises two portions 82 and 84 that extend each other and that are foldable relative to each other in a fold zone 86 so as to form a fiber preform 90 as shown in FIG. 9, in which the portions 82 and 84 form a non-zero angle β between each other. The fiber preform 90 in the example shown presents a section that is substantially L-shaped.

The paths of the weft yarns $t_1$ and $t_3$ forming part of the first and third layer of weft yarns $t_1$ to $t_8$ starting from the face 80a cross one another in the fold zone 86, with the face 80a being the face that, after folding, is situated on the inside of the corner formed by the portions 82 and 84. In addition, the paths of the weft yarns $t_2$ and $t_4$ forming part of the second and fourth layers of weft yarns $t_1$ to $t_8$ starting from the face 80a likewise cross one another in the fold zone 86.

By means of this arrangement, and as shown in the detail on a large scale in FIG. 9, the radii of curvature imposed in particular on the yarns $t_1$ and $t_2$ are further increased in comparison with the embodiment of FIGS. 1 and 2.

Densifying the fiber preform 90 with a matrix makes it possible to obtain a composite material part of the type shown in FIG. 3.

After a fiber preform has been shaped, it is densified by forming a matrix of a nature that is selected as a function of the intended application, e.g. an organic matrix that may be obtained in particular from a resin that is precursor of a polymer matrix such as an epoxy, bismaleimide, or polyimide resin, or a carbon matrix, or a ceramic matrix. With a carbon matrix or a ceramic matrix, densification may be performed by chemical vapor infiltration (CVI) or by impregnation with a liquid composition containing a resin that is a carbon or ceramic precursor followed by heat treatment for pyrolyzing or ceramizing the precursor, which methods are themselves well known. The fibers of the fiber preform are likewise of a material that is selected as a function of the intended application, being made for example of glass, of carbon, or of ceramic.

Finally, it should be observed that in the described embodiments of structures and of fiber preforms, the terms "weft" and "warp" could be interchanged.

The invention claimed is:

1. A fiber structure woven by three-dimensional weaving with a plurality of layers of warp yarns interlinked by weft yarns of a plurality of layers of weft yarns, the fiber structure comprising:
   a first portion and a second portion situated to be extending along and adjacent each other in a weft direction when not folded relative to each other, and the first portion and the second portion being foldable relative to each other to form an angle at a fold zone,
   wherein, in the fold zone and in each weft plane of the fiber structure, two weft yarns situated in a region adjacent to an outside face of the fiber structure situated on an inside of the angle have paths that cross so that arrangements of said two weft yarns in the first and second portions are interchanged, and
   wherein in each of the first portion and the second portion, all of the warp yarns are interlinked by three-dimensional weaving by the weft yarns so as to be free of a non-interlinked zone.

2. A fiber structure according to claim 1, wherein one of the two weft yarns is yarn that, in the first portion or in the second portion, is closest to the outside face.

3. A fiber structure according to claim 2, wherein, in the fold zone, the yarns of two layers of weft yarns closest to the outside face of the fiber structure have paths that cross.

4. A fiber structure according to claim 2, wherein, in the fold zone, yarns of first and third layers of weft yarns from the outside face of the fiber structure have paths that cross, and likewise yarns of second and fourth layers of weft yarns.

5. A fiber structure according to claim 1, wherein the folding is performed about an axis that is parallel to a plane formed by the weft and a warp direction, the axis being not parallel to the weft direction and not parallel to the warp direction.

6. A fiber structure woven by three-dimensional weaving with a plurality of layers of weft yarns interlinked by warp yarns of a plurality of layers of warp yarns, the fiber structure comprising:
   a first portion and a second portion situated to be extending along and adjacent each other in a warp direction when not folded relative to each other, and the first portion and the second portion being foldable relative to each other to form an angle at a fold zone,
   wherein, in the fold zone and in each warp plane of the fiber structure, two warp yarns situated in a region adjacent to an outside face of the fiber structure situated on an inside of the angle have paths that cross so that arrangements of said two warp yarns in the first and second portions are interchanged, and
   wherein in each of the first portion and the second portion, all of the warp yarns are interlinked by three-dimensional weaving by weft yarns so as to be free of a non-interlinked zone.

7. A fiber structure according to claim 6, wherein one of the two warp yarns is yarn that, in the first portion or in the second portion, is closest to the outside face.

8. A fiber structure according to claim 7, wherein, in the fold zone, yarns of two layers of warp yarns closest to the outside face of the fiber structure have paths that cross.

9. A fiber structure according to claim 7, wherein, in the fold zone, yarns of first and third layers of warp yarns from the outside face of the fiber structure have paths that cross, and likewise yarns of second and fourth layers of warp yarns.

10. A fiber preform formed by a fiber structure woven by three-dimensional weaving with a plurality of layers of warp yarns interlinked by weft yarns of a plurality of layers of weft yarns, the fiber structure comprising:
    a first portion and a second portion situated to be extending along and adjacent each other in a weft direction when not folded relative to each other, and the first portion and the second portion forming therebetween an angle by folding at a fold zone,
    wherein, in the fold zone and in each weft plane of the fiber structure, two weft yarns situated in a region adjacent to an outside face of the fiber structure situated on an inside of a corner have paths that cross so that arrangements of said two weft yarns in the first and second portions are interchanged, and
    wherein in each of the first portion and the second portion, all of the warp yarns are interlinked by three-dimensional weaving by the weft yarns so as to be free of a non-interlinked zone.

11. A fiber preform according to claim 10, wherein one of the two weft yarns is yarn that, in the first portion or in the second portion, is closest to the outside face.

12. A fiber preform according to claim 11, wherein, in the fold zone, yarns of two layers of weft yarns closest to the outside face of the fiber structure have paths that cross.

13. A fiber preform according to claim 11, wherein, in the fold zone, yarns of first and third layers of weft yarns from the outside face of the fiber structure have paths that cross, and likewise yarns of second and fourth layers of weft yarns.

14. A composite material part comprising a fiber preform according to claim 10 densified by a matrix.

15. A fiber preform formed by a fiber structure woven by three-dimensional weaving with a plurality of layers of weft yarns interlinked by warp yarns of a plurality of layers of warp yarns, the fiber structure comprising:
    a first portion and a second portion situated to be extending along and adjacent each other in a warp direction when not folded relative to each other, and the first portion and the second portion forming therebetween an angle by folding at a fold zone,
    wherein, in the fold zone and in each warp plane of the fiber structure, two warp yarns situated in a region adjacent to an outside face of the fiber structure situated on an inside of a corner have paths that cross so that arrangements of said two warp yarns in the first and second portions are interchanged, and
    wherein in each of the first portion and the second portion, all of the warp yarns are interlinked by three-dimensional weaving by weft yarns so as to be free of a non-interlinked zone.

16. A fiber preform according to claim 15, wherein one of the two warp yarns is yarn that, in the first portion or the second portion, is closest to the outside face.

17. A fiber preform according to claim 16, wherein, in the fold zone, yarns of two layers of warp yarns closest to the outside face of the fiber structure have paths that cross.

18. A fiber preform according to claim 16, wherein, in the fold zone, yarns of first and third layers of warp yarns from the outside face of the fiber structure have paths that cross, and likewise yarns of second and fourth layers of warp yarns.

\* \* \* \* \*